US007417998B2

(12) United States Patent
Lee

(10) Patent No.: US 7,417,998 B2
(45) Date of Patent: Aug. 26, 2008

(54) WIRELESS NETWORK DEVICE AND COMMUNICATION METHOD USING THE WIRELESS NETWORK DEVICE

(75) Inventor: Joon-hee Lee, Gunpo-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 112 days.

(21) Appl. No.: 11/225,060

(22) Filed: Sep. 14, 2005

(65) Prior Publication Data

US 2006/0057963 A1 Mar. 16, 2006

(30) Foreign Application Priority Data

Sep. 15, 2004 (KR) ................ 10-2004-0073824

(51) Int. Cl.
*H04L 12/28* (2006.01)
*H04L 12/56* (2006.01)

(52) U.S. Cl. .............. 370/401; 370/310.2; 370/312; 370/328; 370/395.5; 370/466

(58) Field of Classification Search .......... 370/401, 370/310.2, 312, 320, 328, 338, 341, 348, 370/349, 351, 389, 392, 395.21, 395.5, 466, 370/467, 235
See application file for complete search history.

(56) References Cited

U.S. PATENT DOCUMENTS

| 5,220,562 | A | * | 6/1993 | Takada et al. ............. 370/404 |
| 6,449,722 | B1 | | 9/2002 | West et al. |
| 6,879,574 | B2 | * | 4/2005 | Naghian et al. ............. 370/338 |
| 6,925,064 | B2 | * | 8/2005 | Hester et al. ............... 370/255 |
| 6,925,069 | B2 | * | 8/2005 | Koos et al. .................. 370/334 |
| 7,016,336 | B2 | * | 3/2006 | Sorensen .................... 370/351 |
| 7,126,926 | B1 | * | 10/2006 | Bjorklund et al. .......... 370/328 |
| 2003/0016636 | A1 | * | 1/2003 | Tari et al. .................... 370/328 |
| 2003/0120821 | A1 | | 6/2003 | Thermond et al. |
| 2003/0142643 | A1 | * | 7/2003 | Yang et al. .................. 370/328 |
| 2003/0152059 | A1 | * | 8/2003 | Odman ....................... 370/338 |
| 2003/0235175 | A1 | * | 12/2003 | Naghian et al. ............. 370/338 |
| 2004/0223477 | A1 | * | 11/2004 | Iwasaki et al. ............. 370/338 |
| 2005/0152305 | A1 | * | 7/2005 | Ji et al. ....................... 370/328 |
| 2005/0221752 | A1 | * | 10/2005 | Jamieson et al. ............. 455/1 |
| 2006/0062187 | A1 | * | 3/2006 | Rune .......................... 370/338 |
| 2006/0080460 | A1 | * | 4/2006 | Kobayashi et al. .......... 709/238 |

FOREIGN PATENT DOCUMENTS

| KR | 2002-0082845 A | 10/2002 |
| KR | 2003-0017455 A | 3/2003 |
| KR | 2003-0088724 A | 11/2003 |
| KR | 10-2004-0004726 A | 1/2004 |

* cited by examiner

*Primary Examiner*—Matthew Anderson
*Assistant Examiner*—Shaima Q Aminzay
(74) *Attorney, Agent, or Firm*—Sughrue Mion, PLLC

(57) ABSTRACT

A wireless network device and a communication method using the wireless network device are provided to simplify an association process of the device moving over different wireless networks and to enhance mobility of the device. The wireless network device includes an allocater allocating a device identifier (ID) to a predetermined device, an information generator generating information on the allocated device ID, and a first controller generating a packet containing the generated device ID and transmitting the generated packet to another wireless network.

16 Claims, 9 Drawing Sheets

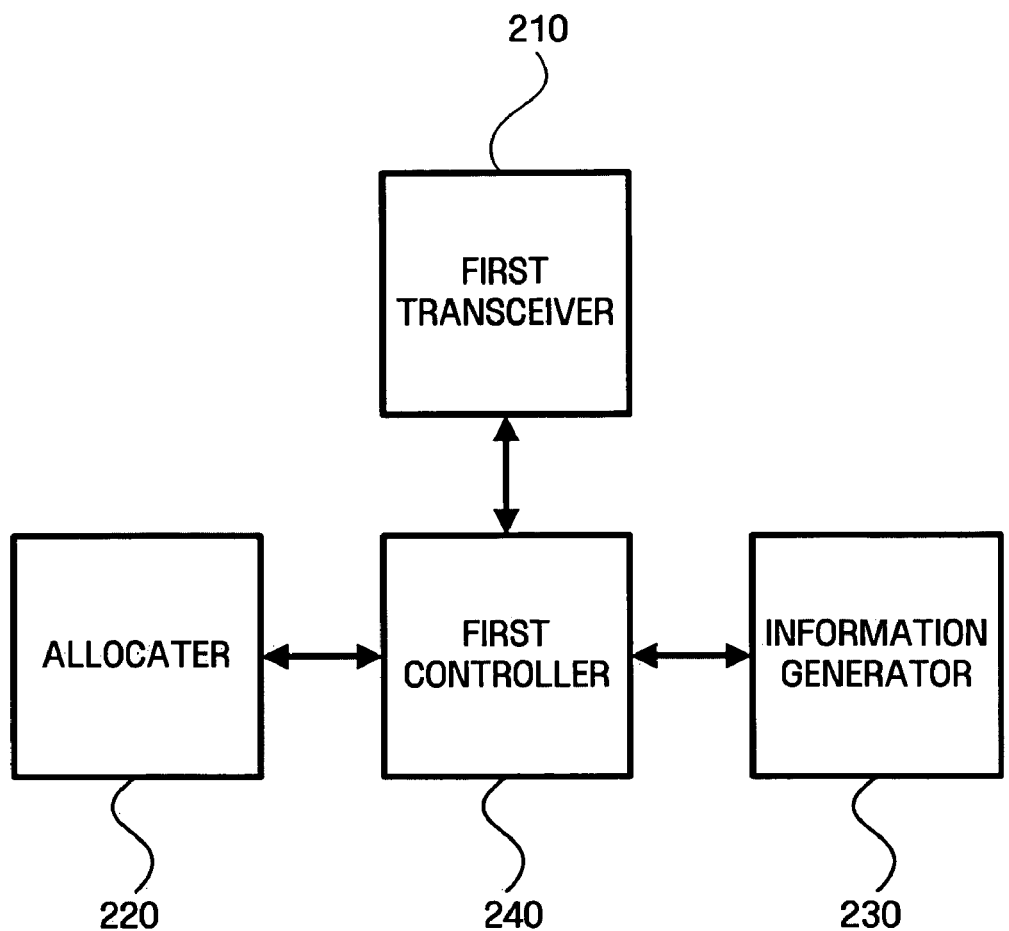

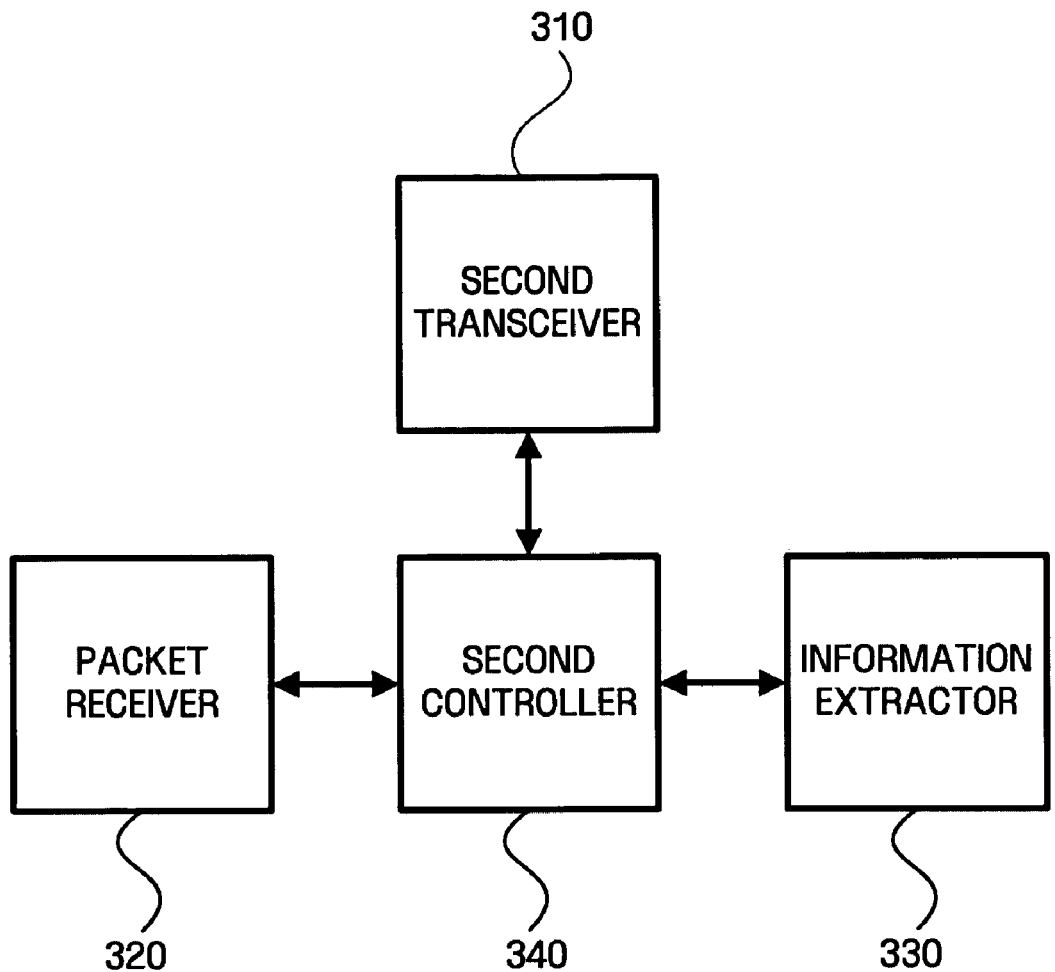

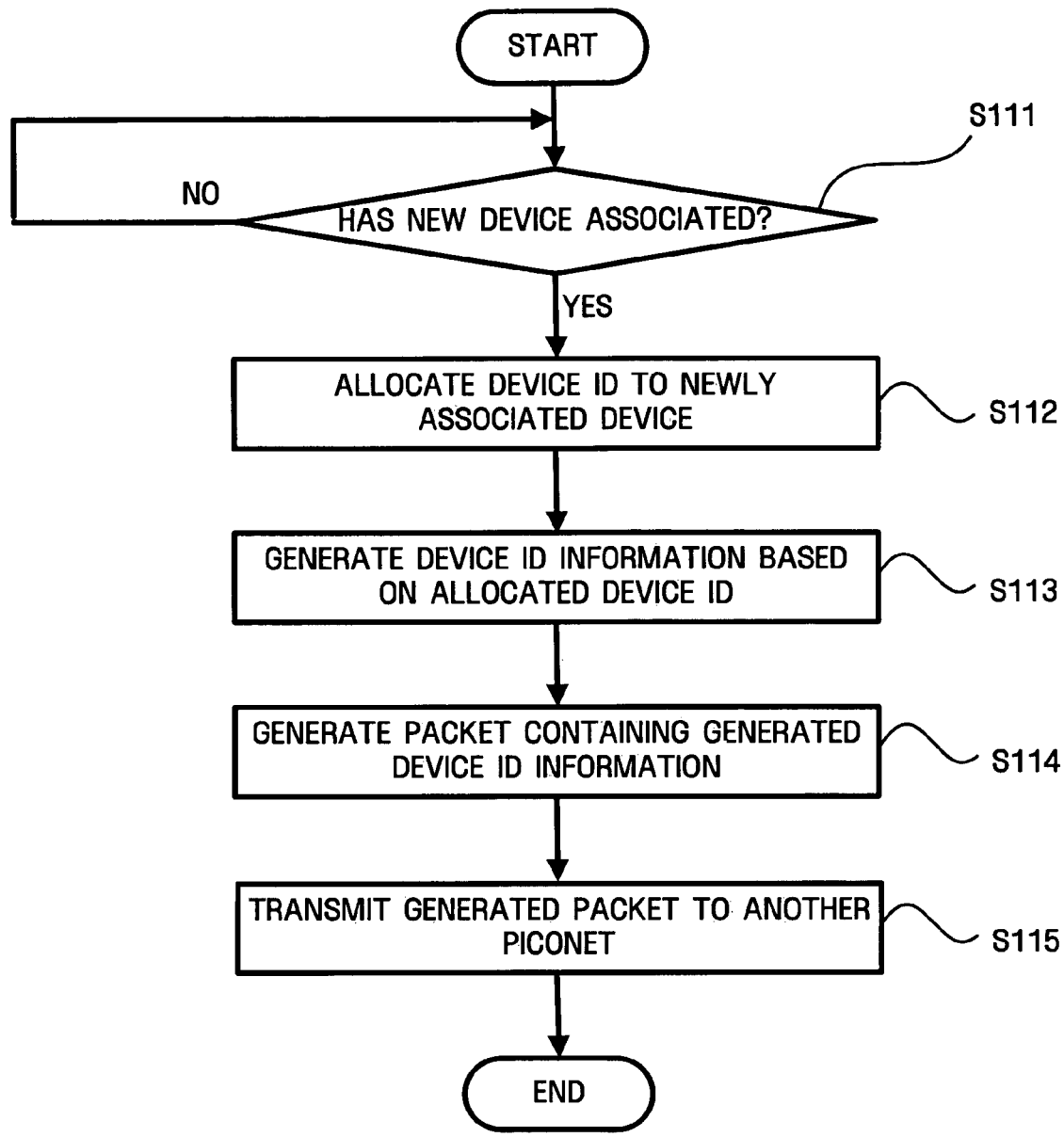

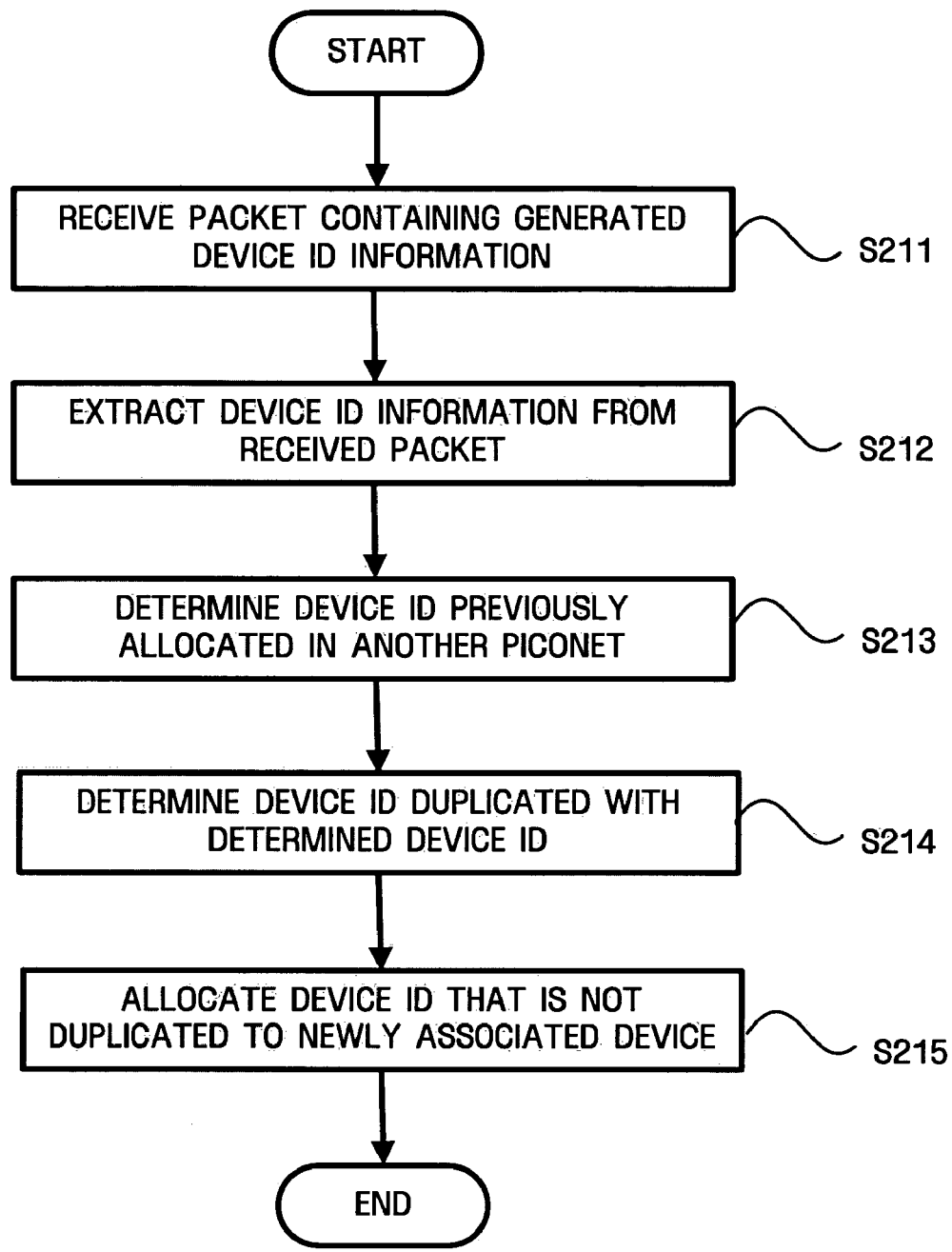

WIRELESS NETWORK DEVICE AND COMMUNICATION METHOD USING THE WIRELESS NETWORK DEVICE

CROSS-REFERENCE TO RELATED APPLICATION

This application claims priority from Korean Patent Application No. 10-2004-0073824 filed on Sep. 15, 2004 in the Korean Intellectual Property Office, the disclosure of which is incorporated herein by reference in its entirety.

BACKGROUND OF THE INVENTION

1. Field of the Invention

The present invention relates to a wireless network device and a communication method using the wireless network device, and more particularly, to a wireless network device and a communication method using the wireless network device designed to simplify an association process of the device moving over the wireless networks and to enhance mobility of the device.

2. Description of the Related Art

With advancements in communication and network technologies, a wired network environment using wired media such as coaxial or optical cables is evolving into a wireless one using wireless signals in various frequency bands.

In line with the transition from wired to wireless technology, a computing device that contains a wireless interface module, enables mobility, and perform specific functions by processing various information ("a wireless network device") is being developed and wireless technologies that enable effective communication between wireless devices on a wireless network are emerging.

There are two major architectures of wireless networks: infrastructure and ad-hoc networks.

The infrastructure network contains an access point (AP) 110 as shown in FIG. 1 whereas the ad-hoc network does not require an AP for communication as shown in FIG. 2.

In an infrastructure mode, the AP 110 not only has connectivity to the wired network but also provides communication among wireless network devices within a wireless network. Thus, all data traffic in the infrastructure network is relayed through the AP 110.

In an ad-hoc mode, wireless network devices within a single wireless network can directly communicate with one another without using an AP.

Such ad-hoc mode wireless networks can be further classified into two types.

In one type of network, which is called a "coordinator-based wireless network", a randomly selected wireless device acts as a coordinator that allocates channel time to other wireless devices within the same wireless network for data transmission, and then the other wireless devices are allowed to transmit data only at the allocated time.

As compared to the coordinator-based wireless network, the other type of network allows all network devices to transmit data at any time desired without using a coordinator.

The coordinator-based wireless network is a single independent coordinator-centered network. When there are multiple coordinator-based wireless networks within a certain area, each network has a unique identifier (ID) to distinguish itself from others.

Thus, while wireless devices can transmit data to and receive data from other network devices during channel time allocated by the coordinator on a coordinator-based network where they belong, they are not allowed to communicate with wireless devices belonging to another coordinator-based network.

For example, in a home network system containing two coordinator-based wireless networks, that is, first and second wireless networks 20 and 30, as shown in FIG. 3, it is assumed that the first wireless network 20 is provided in a living room and the second wireless network 30 is provided in a bedroom, respectively.

If a user desires to watch movies stored on a media server 31 in the bedroom using a portable moving picture player 21 in the living room, then the user cannot watch movies since there is no way to communicate between the first and second wireless networks 20 and 30. Thus, in order to watch the movies, the user has to go to the bedroom.

This problem may arise by restriction on range of radio waves, absence of information on another coordinator-based wireless network, and channel time allocation.

In addition, when the user moves the portable moving picture player 21 from the living room to the bedroom to watch the movie, the portable moving picture player 21 attempts to reassociate with the second wireless network 30 after disassociating from the first wireless network 20. When the portable moving picture player 21 attempts to associate with the second wireless network 30, a coordinator of the second wireless network 30 allocates an identifier to the portable moving picture player 21 for discriminating it among other wireless network devices in the second wireless network 30.

Even though the coordinator allocates different identifiers to the wireless network devices belonging to an identical coordinator-based wireless network, there exist wireless network devices having the same identifier allocated previously in a different coordinator-based wireless network.

As described above, when the wireless network devices having the same identifier previously allocated in the different wireless network exist, the wireless network devices must undergo another association process.

Thus, when a wireless network device moves to different wireless networks, it is necessary for the wireless network device to repeatedly perform association processes, consuming unnecessary time and impeding mobility.

Korean Laid-open Patent Application No. 2004-0004726 proposes a method for reducing delay caused by frequent mobile host authentications in a wireless local area network (WLAN) environment using a reduced authentication token. However, the above-cited reference describes only a method for reducing authentication delay based on the IEEE 802.11x standard. However, there has been no teaching nor suggestion based on the IEEE 802.15.x standard.

SUMMARY OF THE INVENTION

The present invention provides a wireless network device designed to simplify an association process of the device moving between the wireless networks and to enhance mobility of the device, and a communication method using the wireless network device.

According to an aspect of the present invention, there is provided a wireless network device including an allocater allocating a device ID to a predetermined device, an information generator generating information on the allocated device ID, and a first controller generating a packet containing the generated device ID and transmitting the generated packet to another wireless network.

According to another aspect of the present invention, there is provided a wireless network device including a packet receiver receiving a packet containing the generated device ID, an information extractor extracting device ID information from the received packet, and a second controller determining a device ID to be allocated to a device of the wireless network according to the extracted device ID information.

According to still another aspect of the present invention, there is provided a communication method using a wireless network system, the communication method including allocating a device ID to a predetermined device, generating information on the allocated device ID, and generating a packet containing the generated device ID and transmitting the generated packet to another wireless network.

According to a further aspect of the present invention, there is provided a communication method using a wireless network system, the communication method including receiving a packet containing the generated device ID, extracting device ID information from the received packet, and determining a device ID to be allocated to a device of the wireless network according to the extracted device ID information.

BRIEF DESCRIPTION OF THE DRAWINGS

The above and other aspects of the present invention will become more apparent by describing in detail exemplary embodiments thereof with reference to the attached drawings in which:

FIG. 5 is a diagram of a wireless network device transmitting a packet according to an exemplary embodiment of the present invention;

FIG. 6 illustrates device ID information generated according to an exemplary embodiment of the present invention;

FIG. 8 is a diagram of a repeater receiving a packet according to an exemplary embodiment of the present invention;

FIG. 9 illustrates extracted device ID information according to an exemplary embodiment of the present invention;

FIG. 10 illustrates a packet transmitting method according to an exemplary embodiment of the present invention;

FIG. 11 illustrates a packet receiving method according to an exemplary embodiment of the present invention.

DETAILED DESCRIPTION OF EXEMPLARY EMBODIMENTS OF THE INVENTION

Figure 1:
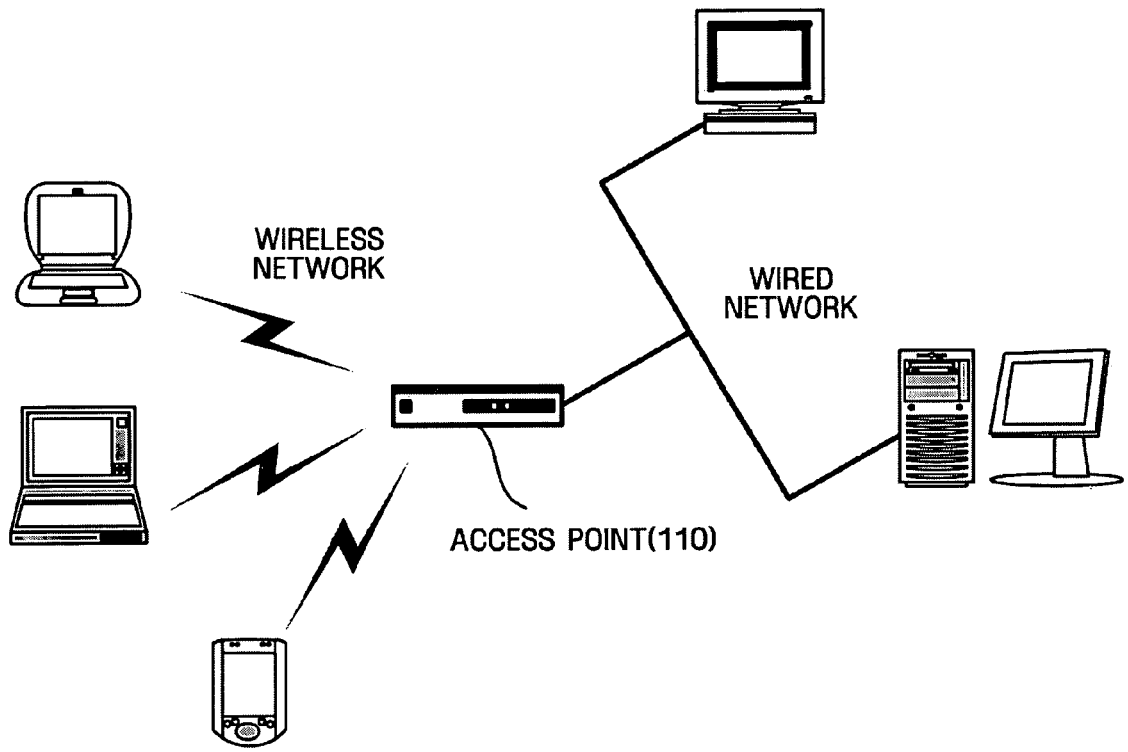
FIG. 1 is an exemplary diagram of a typical infrastructure mode wireless network.
Figure 2:
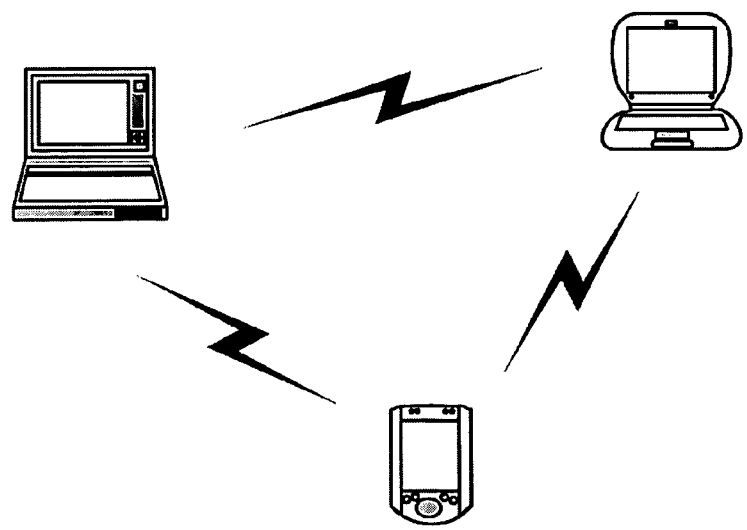
FIG. 2 is an exemplary diagram of a typical ad-hoc mode wireless network.
Figure 3:
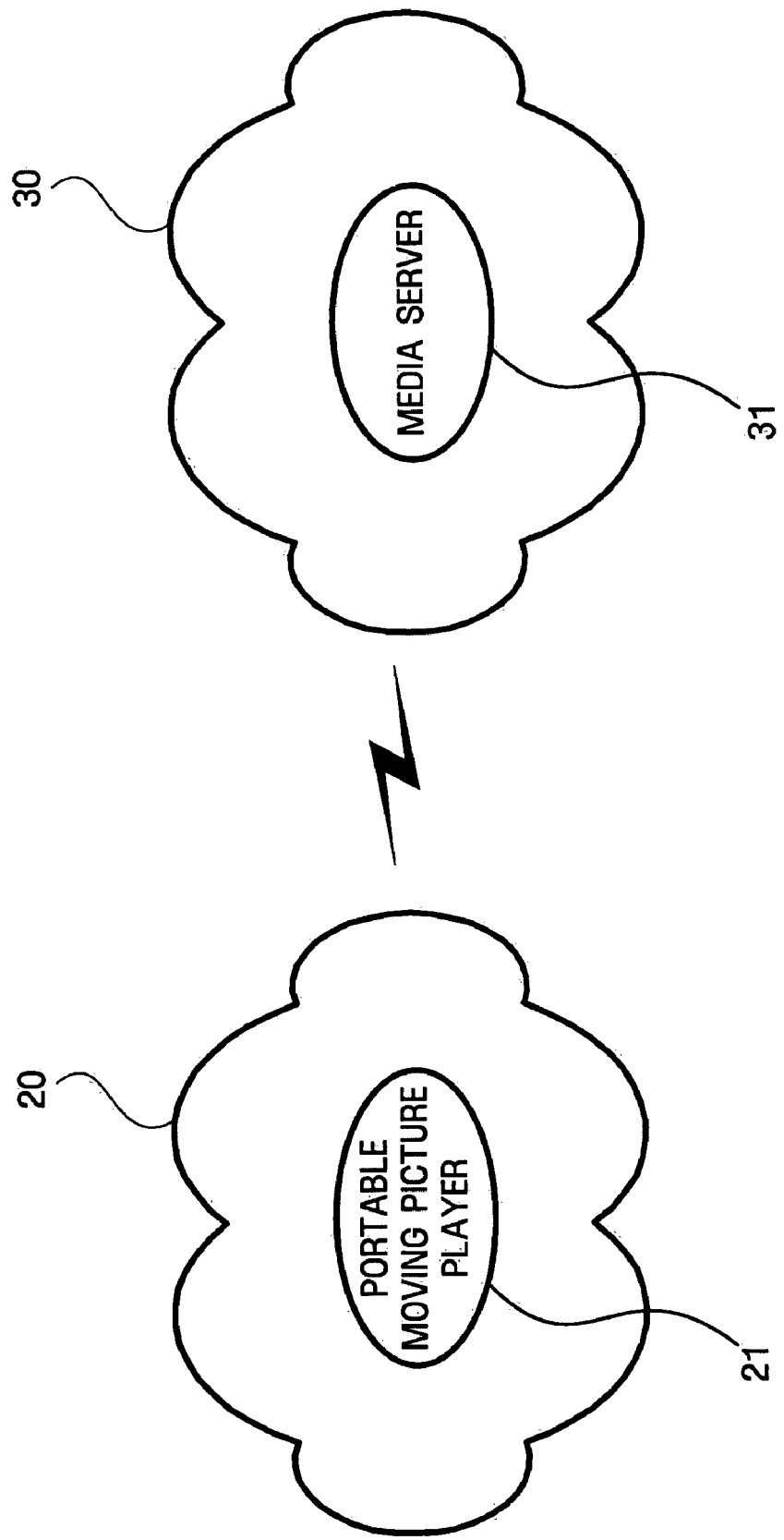
FIG. 3 is an exemplary diagram of a typical coordinator-based wireless network.

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Meanwhile, Institute of Electrical and Electronics Engineers (IEEE) 802.15.3 proposes standards for a physical (PHY) layer corresponding to a Physical Layer of the seven layers of the Open System Interconnection (OSI) network model developed by the International Organization for Standardization (ISO) for wireless networks and a Medium Access Control (MAC) layer corresponding to a Data-link Layer.

Therefore, to assist in better understanding the present invention, a WPAN compliant with the IEEE 802.15.3 standard, and more particularly, a network system for enabling data communication between wireless network devices belonging to different WPANs by connecting multiple WPANs via a wired backbone at an MAC layer will now be described as an exemplary embodiment of a coordinator-based wireless network.

In addition, for consistent use of terms, a wireless network device and a single network created by one or more devices are hereinafter referred to as a "device" and a "piconet", respectively, as defined in a WPAN.

Meanwhile, a coordinator is randomly selected among network devices within a single wireless network and allocates "channel time" to other network devices within the same network for data transmission. The coordinator may also allocate logical addresses to network devices within the same network to which it belongs. The coordinator broadcasts physical addresses and logical addresses of network devices within a coordinator-based wireless network to which it belongs so that each network device becomes aware of physical/logical address pairs of all other network devices.

A physical address is a hardware address that uniquely identifies each network device on a network and is preset during manufacturing of the device. That is, the physical address of each network device is unique across the entire network. A logical address is another type of address that uniquely identifies each network device on a network and is allocated by a coordinator. The logical address has a unique value within a coordinator-based network. Thus, when a network device disassociates from the existing wireless network and associates with a new wireless network, the network device can be allocated a new logical address, which is unique across the other wireless network, by a coordinator in the other wireless network.

A backbone physical address uniquely identifies a network device connecting to a wired backbone network on the wired backbone network. That is, the backbone physical address is a physical address format used in the wired backbone network.

Figure 4:
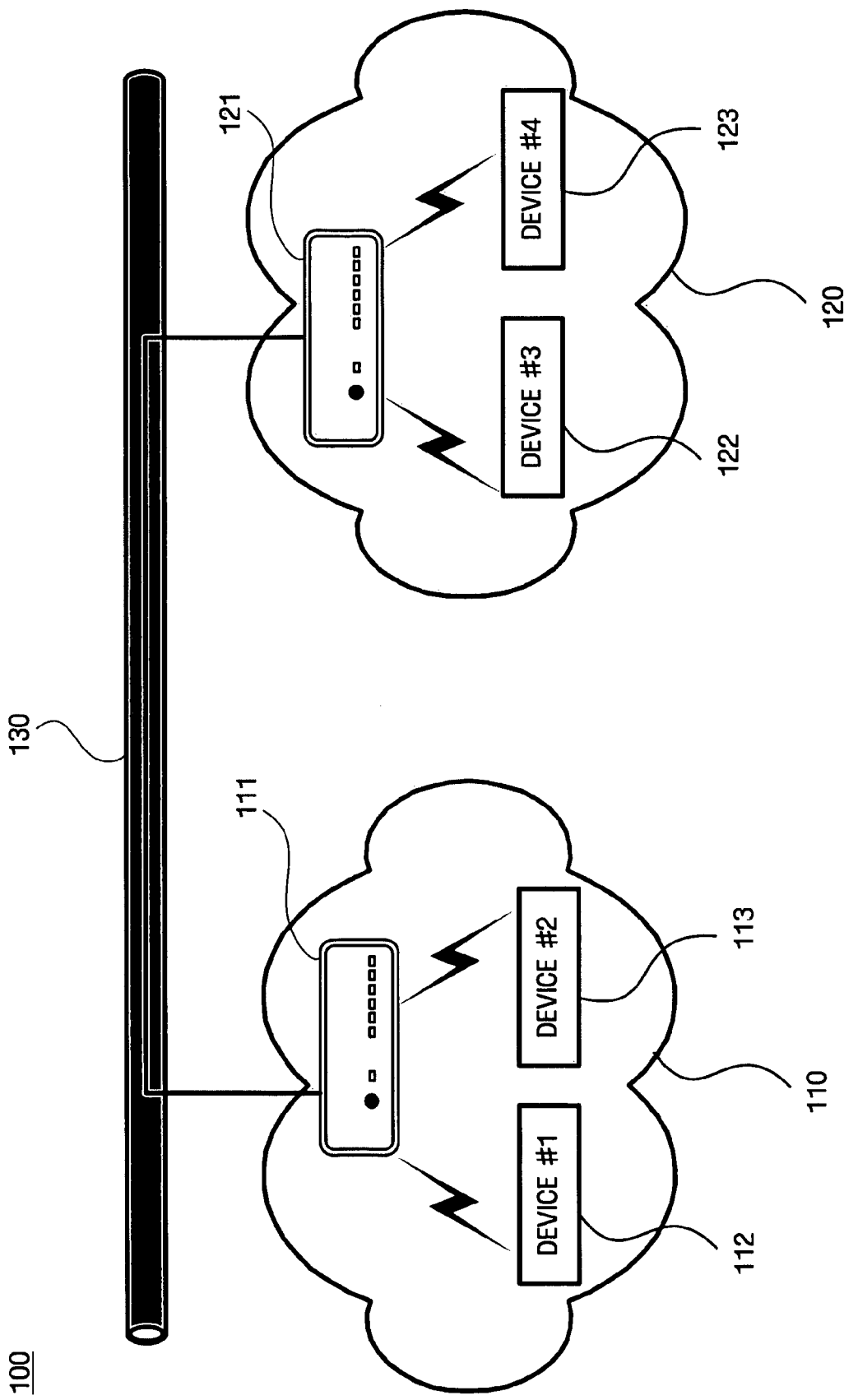
FIG. 4 shows a network system according to an exemplary embodiment of the present invention.

FIG. 4 is a diagram of a network system 100 according to an exemplary embodiment of the present invention.

Referring to FIG. 4, the network system 100 includes a plurality of piconets 110 and 120 and a wired backbone network 130 connecting with the piconets 110 and 120.

The piconets 110 and 120 enable both wired and wireless communications and respectively include repeaters 111 and 121 connecting the piconets 110 and 120 with the wired backbone network 130 and a plurality of devices 112, 113, 122, and 123 performing wireless communications. In this case, for clear distinction, the piconets 110 and 120 are hereinafter called first and second piconets, respectively, the repeaters 111 and 121 are referred to as first and second repeaters, respectively, and the plurality of devices 112, 113, 122, and 123 are referred to as device #1, #2, #3, and #4, respectively.

While the exemplary embodiment shown in FIG. 4 describes that the piconets 110 and 120 are connected through the wired network 130, they may be connected through a wireless network.

Further, a device acting as a coordinator may be selected among the devices belonging to either the first or second piconet 110 or 120. In a WPAN, the device acting as a coordinator is named a "Piconet coordinator" PNC. The repeaters 111 and 121 as well as the devices #1 112, #2 113, #3 122, and #4 123 may be elected as PNCs.

In the present exemplary embodiment, it is assumed that the first repeater 111 belonging to the first piconet 110 or the second repeater 121 belonging to the second piconet 120 serves as a coordinator.

Each of the first and second repeaters 111 and 121 may include a router, a wired/wireless bridge, a device, or a PNC depending on the type of network topology. The first and second repeaters 111 and 121 may connect a wired network with a wireless network or connect wireless networks with each other.

Meanwhile, the wired network 130 can comply with any wired network protocol based on a communication medium such as coaxial cable, optical cable, power line, or phone line. The protocol for the wired network 130 may vary depending on a physical environment where the present invention is applied.

In the present exemplary embodiment, when the device #1 112 desires to communicate with the device #2 113, i.e., when a communication is made between devices within the same piconet, it can comply with the conventional IEEE 802.15.3 standard.

However, when the device #1 112 belonging to the first piconet 110 wishes to communicate with the device #3 122 belonging to the second piconet 120, that is, when a communication is made between devices belonging to different piconets, it is very difficult to implement a communication mechanism only with a frame format compliant with the conventional IEEE 802.15.3 standard.

The conventional IEEE 802.15.3 standard supports an eight-byte MAC address as a physical address of a device and converts the eight-byte MAC address into a one-byte logical device ID (DevID) to reduce an MAC header overhead when generating an MAC frame. A device ID is information for identifying a device from others. A device ID of each device may be determined by a PNC. However, it is often the case that device IDs of different piconet devices cannot be identified from one another. Thus, when a device moves from one piconet to another, duplicate device IDs may be allocated to the device.

Therefore, in the exemplary embodiment of the present invention proposes, when a new device has associated with a concerned piconet, the first repeater 111 of the piconet 110 or the second repeater 121 of the second piconet 120 transmits the device ID allocated to the device associated with the piconet to the repeater of the other piconet through the wired network 130.

Therefore, when repeaters of different piconets allocate device IDs to devices that have newly associated with the corresponding piconets thereof, it is possible to avoid allocation of duplicated device IDs to the newly associated devices.

FIG. 5 is a diagram of a repeater allocating a device ID to a newly associated device and transmitting the allocated device ID to a repeater of another piconet according to an exemplary embodiment of the present invention.

Referring to FIG. 5, the repeater includes a first transceiver 210 transmitting and receiving data through the wired network (130 shown in FIG. 4), a device ID allocater 220 allocating a device ID to a device having newly associated with the corresponding piconet, an information generator 230 generating information on the device ID allocated to the device, and a first controller 240 generating a packet containing the generated device ID information and transmitting the generated packet to another piconet.

Here, the device ID information may be generated by the information generator 230 when an Access Point Management Entity (APME) requests a device ID information allocated to an Inter Access Point Protocol (IAPP). In this case, the device ID information generated by the IAPP may include a device ID, an MAC address, a Sequence Number, a Timeout, and so on, as shown in FIG. 6.

APME and IAPP are defined in the conventional IEEE 802.11f standard. In the exemplary embodiment of the present invention, a case of using the IEEE 802.11f standard in transceiving of packets based on the IEEE 802.15.3 standard will be described by way of example. In addition, the exemplary embodiment of the present invention describes that transceiving of packets can be achieved using internal protocols as well as the IAPP.

Figure 7:
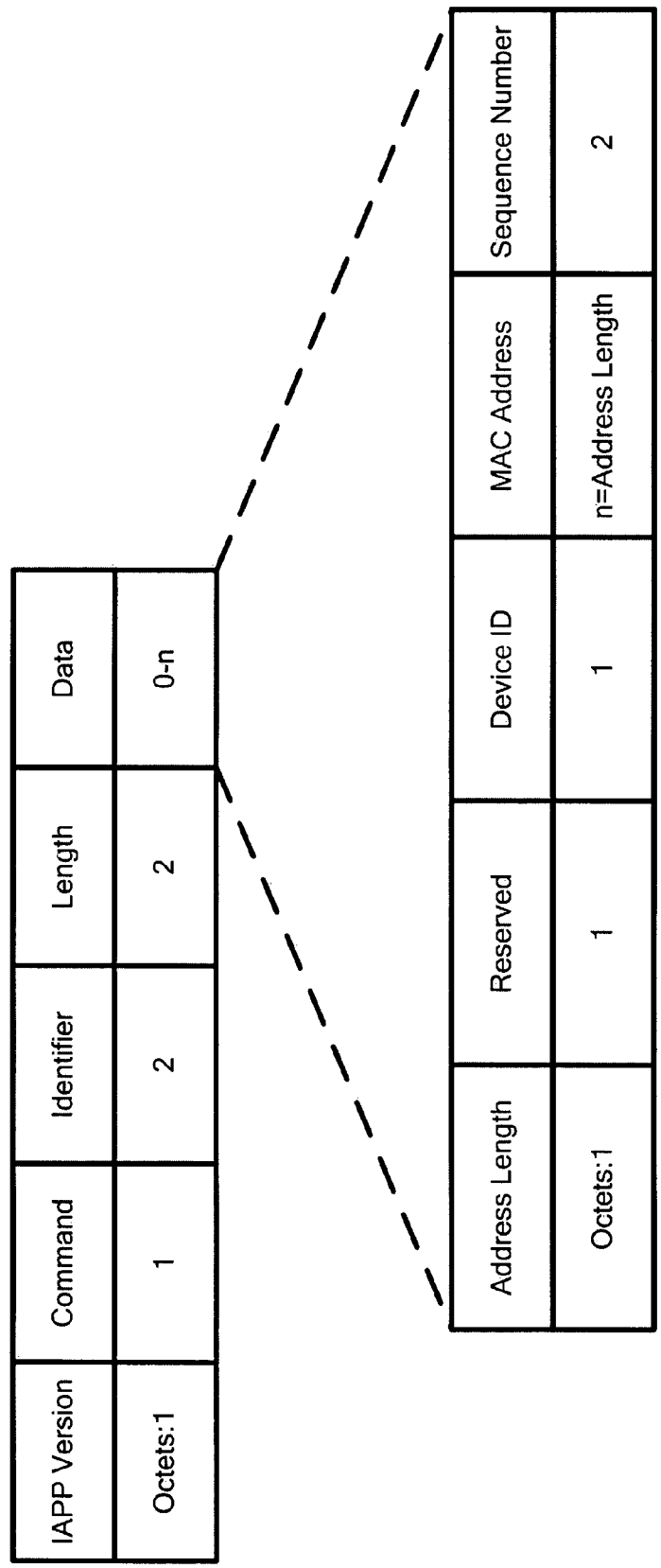
FIG. 7 illustrates a structure of a packet generated according to an exemplary embodiment of the present invention.

As shown in FIG. 7, the first controller 240 may generate a packet 400 containing the generated device ID information. Specifically, the generated packet 400 includes an IAPP Version field, a Command field, an Identifier field, a Length field, and a Data field. In addition, the Data field includes an Address Length field, a Reserved field, a Device ID field, an MAC Address field, and a Sequence Number field.

Like in the case where a new device has associated with a piconet, a packet may also be transmitted in a case where the associated device has dissociated from the piconet. Here, the device ID allocated to the dissociated device can be again allocated to another piconet.

FIG. 8 is a diagram of a repeater receiving a packet transmitted according to the present invention and determining a device ID to be allocated based on the device ID contained in the received packet.

Referring to FIG. 8, the repeater includes a second transceiver 310 transmitting and receiving data through the wired network (130 shown in FIG. 4), a packet receiver 320 receiving a packet through the wired network 130, an information extractor 330 extracting device ID information from the received packet, and a second controller 340 determining a device ID to be allocated to a newly associated device according to the extracted device ID information.

An APME may be notified of the device ID information extracted by the information extractor 330 by the IAPP. In this case, the extracted device ID information may include a device ID, an MAC address, and so on, as shown in FIG. 9.

The second controller 340 determines device IDs previously allocated in another piconet based on the extracted device ID information to select device IDs that are not duplicated with the determined device IDs among allocatable device IDs, and allocates the selected device IDs to the newly associated device.

FIG. 10 is a flowchart illustrating a process of allocating a device ID to a newly associated device and transmitting the allocated device ID to a repeater of another piconet.

Referring to FIGS. 4, 5 and 10, in operation S111, it is determined whether a new device has associated with a pertinent piconet. When it is determined that the new device has associated with the pertinent piconet, the allocater 220 allocates a device ID to the new device, in operation S112.

The exemplary embodiment is intended to provide a detailed description of an example of the invention in a case where a new device is associated with the first piconet 110.

If the device ID is successfully allocated to the new device, the information generator 230 generates device ID information to transmit the allocated device ID to the repeater of another piconet in operation S113. Here, the generated device ID information is the same as illustrated in FIG. 6.

For example, when the device #2 113 has newly associated with the first piconet 110, the first repeater 111 can allocate a new device ID to the device #2 113.

In operation S114, the first controller 240 generates a packet 400 to be transmitted to the repeater of another piconet based on the generated device ID information. In this case, the generated packet is the same as illustrated in FIG. 7.

For example, when the device ID is allocated to the device #2 113 that has newly associated with the first piconet 110, the first repeater 111 can transmit the generated packet to the second repeater 121 of the second piconet 120.

If the packet is generated, the first controller 240 transmits the generated packet to the repeater of another piconet connected to the wired network 130 via the first transceiver 210 in operation S115.

FIG. 11 is a flowchart illustrating a process of receiving a packet transmitted according to an exemplary embodiment of the present invention and determining a device ID to be allocated to a newly associated device based on device IDs contained in the received packet.

Referring to FIGS. 4, 8 and 11, in operation S211, the packet receiver (320 shown in FIG. 8) receives a packet received through the second transceiver 310. Here, the received packet is the same as illustrated in FIG. 7.

In the exemplary embodiment of the invention, a case where a packet generated at a newly associated device created at the first piconet (110 shown in FIG. 4) is transmitted to a second piconet (120 shown in FIG. 4) will be described by way of example.

In operation S212, the information extractor 330 extracts device ID information from the received packet.

In operation S213, the second controller 340 determines a device ID to be allocated to a newly associated device according to the extracted device ID information.

In operation S214, the second controller 340 determines whether device IDs previously allocated in the second piconet 120 based on the extracted device ID information are duplicated with the determined device IDs among allocatable device IDs.

In operation S215, the second controller 340 allocates a device ID that is not duplicated with the device ID based on the extracted device ID information to the newly associated device.

Figure 12:
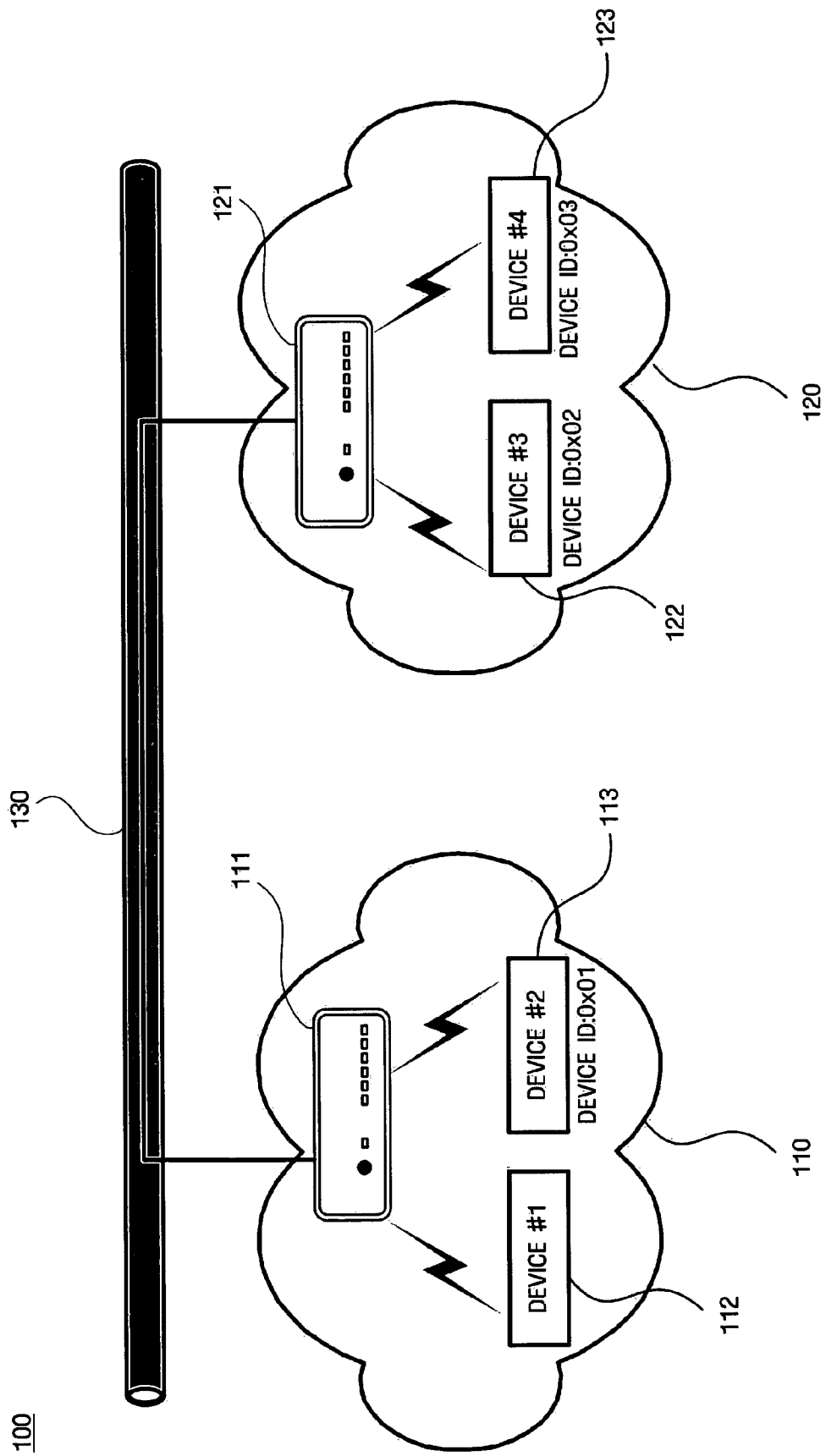
FIG. 12 illustrates allocated ID information according to an exemplary embodiment of the present invention.

In such a manner as described above, allocation of duplicated device IDs can be prevented. As shown in FIG. 12, in a case where the device ID 0x01 is allocated to the second device #2 113 of the first piconet 110, 0x02 and 0x03, which are not identical with 0x01, may be allocated to the third device #3 122 and the fourth device #4 123 of the second piconet 120.

Therefore, since the same device ID that is allocated to a predetermined device can be used even when the predetermined device moves to another piconet, an association process to be taken by the device moving to another piconet can be simplified. According to the prior art, when the device having a device ID previously allocated in an existing piconet moves to another piconet, the device must repeat request and response processes twice for reassociation. By contrast, according to the present invention, when the device moves over different wireless networks, a process of allocating a new device ID to the device having moved over different wireless networks may be skipped.

According to a wireless network device and a communication method using the same, since the device has a single device ID, association of the device can be expedited even when the device moves over different wireless networks.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wireless network device of a first wireless network, the wireless network device comprising:
   an allocater which allocates a device identifier (ID) to a predetermined device;
   an information generator which generates information on the device ID; and
   a controller which generates a packet containing the information on the device ID and transmits the packet to a second wireless network,
   wherein the first and second wireless networks are independent coordinator-based networks, and
   wherein, in the second wireless network, the device ID is allocated to the predetermined device.

2. The wireless network device of claim 1, wherein the information on the device ID comprises at least one of an allocated device ID, a Medium Access Control (MAC) address, and a sequence number.

3. The wireless network device of claim 2, wherein the allocater allocates the device ID if the predetermined device has associated with or dissociated from the wireless network device.

4. The wireless network device of claim 1, wherein the first wireless network and the second wireless network are both ad-hoc networks.

5. A wireless network device of a first wireless network, the wireless network device comprising:
   a packet receiver which receives a packet from a second wireless network containing device identifier (ID) information of a predetermined device;
   an information extractor which extracts the device ID information from the packet; and
   a controller which determines a device ID to be allocated to the predetermined device of the first wireless network according to the device ID information,
   wherein the first and second wireless networks are independent coordinator-based networks, and
   wherein, in the first wireless network, the device ID is allocated to the predetermined device.

6. The wireless network device of claim 5, wherein the device ID information comprises at least one of an allocated device ID, a Medium Access Control (MAC) address, and a sequence number.

7. The wireless network device of claim 6, wherein the device ID information comprises a device ID previously allocated to the predetermined device in the second wireless network.

8. The wireless network device of claim 7, wherein the controller determines the device ID previously allocated in the second wireless network based on the extracted device ID information, selects a device ID that is not duplicated with the determined device ID among allocatable device IDs, and allocates the selected device ID to a newly associated device.

9. A communication method using a wireless network system, the communication method comprising:
   a first wireless network allocating a device identifier (ID) to a predetermined device;
   the first wireless network generating information on the device ID; and
   the first wireless network generating a packet containing the information on the device ID and transmitting the packet to a second wireless network,
   wherein the first and second wireless networks are independent coordinator-based networks, and
   wherein, in the second wireless network, the device ID is allocated to the predetermined device.

10. The communication method claim 9, wherein the information on the device ID comprises at least one of an allocated device ID, a Medium Access Control (MAC) address, and a sequence number.

11. The communication method of claim 10, wherein the device ID is allocated if the predetermined device has associated with or dissociated from the wireless network device.

12. The communication method of claim 9, wherein the first wireless network and the second wireless network are both ad-hoc networks.

13. A communication method using a wireless network system, the communication method comprising:
   a first wireless network receiving a packet from a second wireless network containing a device identifier (ID);
   the first wireless network extracting device ID information from the packet; and
   the first wireless network determining a device ID to be allocated to a device of the first wireless network according to the device ID information,
   wherein the first and second wireless networks are independent coordinator-based networks.

14. The communication method of claim 13, wherein the extracted device ID comprises at least one of an allocated device ID, a Medium Access Control (MAC) address, and a sequence number.

15. The communication method of claim 14, wherein the device ID information comprises a device ID previously allocated to the device in the second wireless network.

16. The communication method of claim 15, wherein the allocating of the device ID comprises:
   determining the device ID previously allocated in the second wireless network based on the extracted device ID information to select a device ID that is not duplicated with the determined device ID among allocatable device IDs; and
   allocating the selected device ID to a newly associated device.

* * * * *